March 24, 1970 K. E. BÖRSETH 3,502,264
APPARATUS FOR DISPLAYING MOMENTS SHEARING
FORCES ETC. ON BOARD SHIPS
Filed Feb. 27, 1968 2 Sheets-Sheet 1
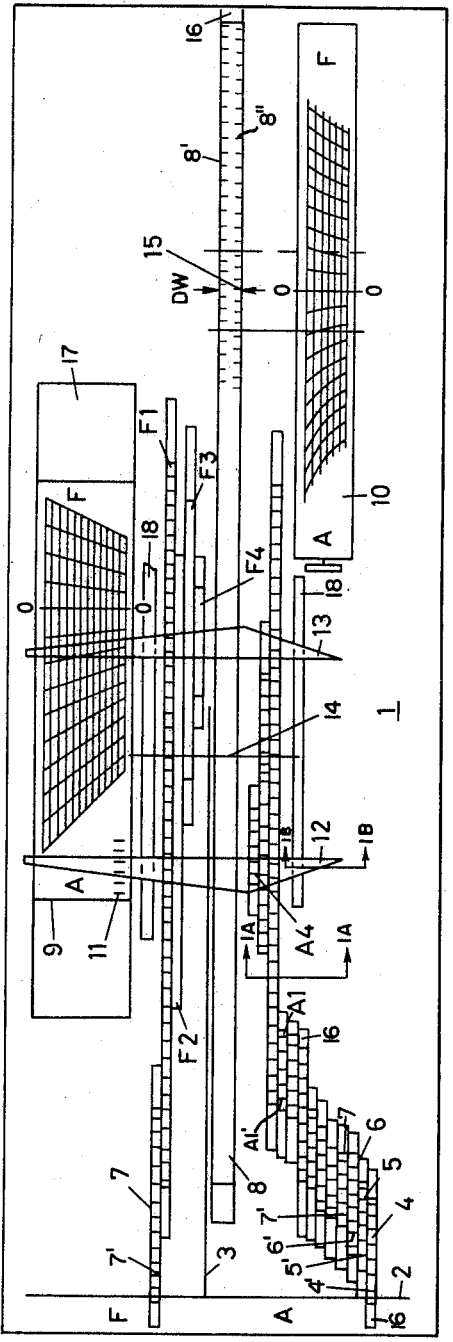
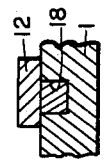

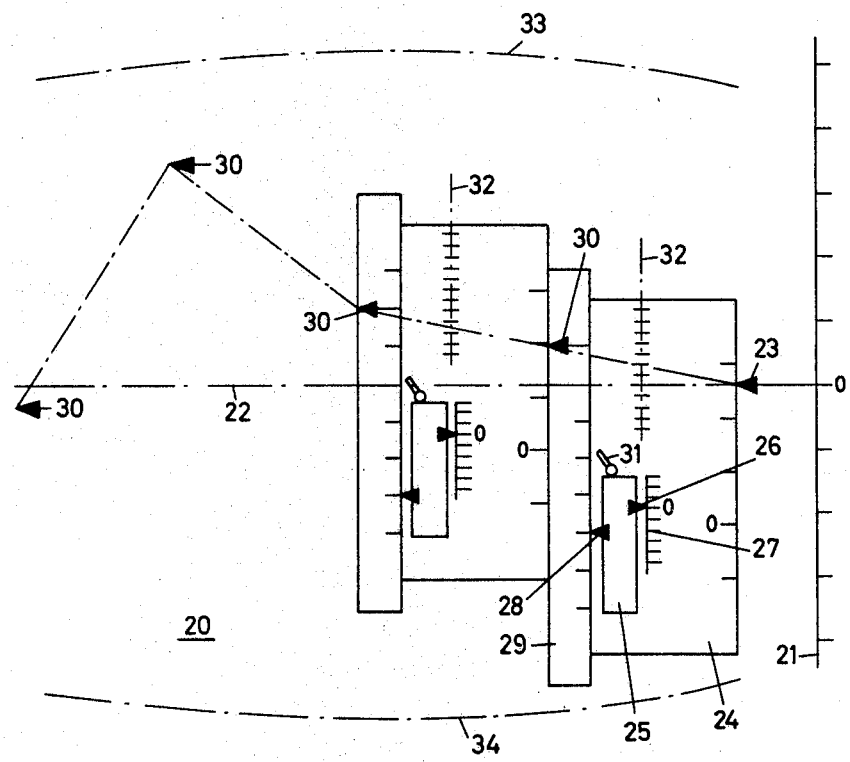

United States Patent Office 3,502,264
Patented Mar. 24, 1970

3,502,264
APPARATUS FOR DISPLAYING MOMENTS SHEARING FORCES ETC. ON BOARD SHIPS
Knut E. Börseth, Horten, Norway, assignor to A/S Horten Verft, Horten, Norway
Filed Feb. 27, 1968, Ser. No. 708,563
Claims priority, application Norway, Feb. 28, 1967, 160,999
Int. Cl. G06g 1/06
U.S. Cl. 235—69                                         2 Claims

ABSTRACT OF THE DISCLOSURE

An apparatus for indicating moments, shearing forces and similar values aboard a vessel, wherein a plurality of slideable elements, each corresponding to the weight of the various holds in the vessel, both fore and aft, and a dead weight slideable rod are provided on a panel relative to a base line thereon. A pair of rods, for indicating draught and trim, respectively, are also provided on the panel along with sliders, for the purpose of coordinating the values set by means of the slideable elements and to transfer the results to the rods.

---

The present invention relates to an apparatus for the display of moments, shearing forces, etc. aboard ships, adapted to provide a simple, comprehensive and totally mechanical means for facilitating the duties of the ship's officers when distributing the load, under consideration of the the net weight of the ship, provisions etc., and enabling the control of such distribution.

For such purposes, various mechanical or electrical analogous apparatus are provided. The mechanical apparatus are complicated or somewhat comprehensive in construction and use, as they do not enable a continuous control of the values introduced into the apparatus. The electrical analogous apparatus are based on the condition that the individual values, which together form a load condition, are represented by electrical values or conditions.

Consequently, the display of a condition, or the calculation of a desired condition depends on one or more equilibrium conditions. Thus, it is inevitable that the apparatus in itself, and the use of the same involves fault sources, which may only be traced with high difficulty, if at all, in a simple manner.

The object of the present invention is an apparatus wherein the fault sources are reduced to a minimum, and wherein the use is the simplest possible and wherein the survey is ameliorated, in particular such that the display result, including the constructional details of the same, remain in the apparatus and may both be seen and controlled and, last but not least, reproduced, for instance by photography, and consequently stored in all details.

According to the invention, this is achieved by an apparatus which comprises a number of mutually parallel elements which are mounted for rectilinear displacement relative to a base line and to each other, and each of which is provided with a scale or graduation corresponding to the individual values forming part of the result desired, in particular, moment values or shearing force values, relative to one common or individual athwartship plane in the ship. This construction, which to a certain degree is remindful of the principle of an ordinary slide rule, allows all settings of the individual elements to not only be performed in such a manner that they are clearly visible at all times, but also permits the settings to be performed by simple displacements which may be accomplished manually without involving any succeeding effect in the adjustment proper.

For the purpose of facilitating the setting of the various elements relative to each other and to the stationary parts of the apparatus, and for the purpose of transferring intermediate results between individual elements, it may be convenient to arrange sliders or cursors which, like the slideable elements, are guided in longitudinally extending guides in the apparatus, and which extend across the slideable elements.

As indicated, the apparatus is based upon elements which are slideably mounted relative to a base line and to each other, but according to a further feature of the invention, one or more stationary elements may be provided, which are graduated in hydrostatic units of the ship and which, together with the slideable elements and possibly one or more cursors, will provide further results of interest, such as meta centric height, correct midship depth and the like.

Before entering on a detailed description of how the apparatus of the invention may be brought into performance, a statement will be given of the theoretical basis of the elements which are included and which are to cooperate for the achievement of the desired result.

The calculation of the fore-and-aft stresses in a ship is based on the fact that it must be possible to combine the moments to which the ship is subjected, relative to the athwartship plane which might be chosen as a base, usually the plane L/2, i.e. the plane at the middle of the length of the ship, according to distribution with a base in the athwartship plane in question.

The moments, to which the ship is subjected, as fore-and-aft stresses are:

ML—the weight moment of the net ship, i.e. net weight of the ship without any load or provisions of any kind;
Mo—the buoyancy moment of the ship at the draught in question;
Mw—the weight moment due to provisions, load etc.;
and MTo—correction of the buoyancy moment due to trim.

Based on these factors and their combination, it is possible to arrive at the results which are decisive to the operation and stress of the ship. Thus, the fore-and-aft stresses will be the sum of the four moments referred to above, while, for instance, the shearing stresses will depend upon the differences between loading and buoyancy between the various athwartship planes.

All the factors mentioned may be combined on the basis of static information about any individual ship.

In general, the said factors may be utilized, according to the following considerations:

When provisions, bunkers, etc., are taken into account, the weight moment of load Mw may be calculated separately for the foreship (F) and the aftship (A).

A survey of the two moments, which are constituted by the moments of the provisions, etc., and the load moments, may be accomplished by a linear addition, based on a ton-meter scale referring to the midship plane, each factor being allotted an element, graduated in tons.

Through a measure of such sums of MwA and MwF, it is possible to identify a possible fore or aft trim, and on the basis thereof, perform an adjustment by such a change in the distribution of the load such that the trim moment $MT = MwF + MwA$ be made equal to $MTL + MTo$, wherein MTL is given by the trimming moment at net ship relatively to L/2 and MTo is the buoyance moment about L/2. This provides zero trim. MTL is a constant to each individual ship, and MTo depends on the draught of the ship in the condition in question the total moment $$M = MT + MTL + MTo$$

and may, consequently, be so expressed $M = MT$ plus a function of the draught or dead weight of the ship.

Through the use of slideable rods, it is possible, solely by means of an apparatus according to the invention, to derive the moments to which the ship is subjected at a certain load condition, but also to read out draught and shearing stresses of the ship, as well as other conditions of particular interest, such as metacentric height or the like.

With reference to the accompanying drawings, examples are now to be described of how the invention may be brought into performance, based on the principles of the invention, as outlined above.

In the drawings,

FIGURE 1 is a schematic view of the front of an apparatus, according to the invention, adapted for the display of midships bending moments, trim and corrected draught amidships, as well as draught fore and aft.

FIGURES 1A and 1B are sectional views taken, respectively, along lines 1A—1A and 1B—1B of FIGURE 1.

FIGURE 2 is a simplified view of a corresponding apparatus adapted to display shearing forces.

The apparatus shown in FIG. 1 comprises a panel 1, in which there are arranged a number of parallel guides or slots 16, each adapted to receive a rod or an endless ribbon, each of which may be displaced longitudinally relative to the panel and to each other, as will be explained hereinafter. At the left edge of the panel 1, there is a vertical line 2, which, in the embodiment shown, represents the amidships middle sectional plane at L/2, but obviously it is possible to arrange matters so that the line represents any such line, for instance, L/4 if a survey relative to such line is desired.

Longitudinally, the panel is divided in a top and a bottom field, by means of a longitudinally extending line 3, so that the conditions in the foreship may be displayed above, and those of the aftship below this line.

In the portions above and below the line 3, respectively of the panel, there is provided a number of slots or guides, and in each of such slots or guides 16 (shown typically in FIGURE 1A), there is provided an element which is graduated in tons (shown, for example at 4' to 7'), corresponding to the weight of one space or hold in the ship. Thus, and by way of example, the element 4 corresponds to provision, the element 5 corresponds to bunkers, the element 6 corresponds to fresh water, the elements 7 to ballast, and on so, while the elements A1 to A4 and F1 to F4 correspond to holds 1 to 4 in the aftship and foreship, respectively.

As mentioned, all such rods are graduated in tons, and by displacing the same in their slots or guides 16 relative to the base line 2, they display the number of ton-meters represented by the provision, water, etc., in the bending moment relative to the base line. Through the setting of the rods relative to the base line and to each other it is, consequently, possible to display the moments to which the ship is subjected about the base line chosen at, for instance, L/2.

Further, the apparatus is provided with a central ribbon or rod 8, which is graduated in dead weight tons (as at 8') along the top edge, and in draught (as at 8') along the lower edge, and which may be displaced longitudinally along slot 16 relative to a top and a lower stationary mark DW, in order to thereby indicate the dead weight, i.e. useful load, which is presumed under the load condition under consideration, and also to indicate the corresponding midship draught.

The apparatus is also provided with a so-called trim rod 9 and a draught rod 10, both divided in a foreship and an aftship section F and A, respectively.

The rod 9, which is longitudinally slideable along its slot 17, is provided with horizontal lines corresponding to different draughts in feet, and with more or less oblique or curved lines to different, constant trim values in feet or inches which, together, indicate the variation of the unity trim moment at draught and trim. Further, the rod 9 is, near the lower left corner, provided with a graduation 11 which, relative to a 0—0 line on the rod 9 indicates the same number of dead weight tons as the number indicated by the ribbon 8, as mentioned above.

The rod 10, which may be rotatably mounted about its direction of length, for use according to the trim indicated by means of the scale 9 in the foreship or in the aftship, is provided with horizontal draught lines, similar to those, of the rod 9, and with oblique or curved trim lines corresponding to the position of the buoyancy centre of the ship relative to the fore-and-aft center line of the ship, the base line 2.

Further, the apparatus is provided with sliders 12 and 13 slideable in slots 18 shown more clearly in FIGURE 1B, for the purpose of coordinating the values set by means of the slidable elements and to transfer the results to the rods 9 and 10, respectively.

The apparatus is used in the following manner:

Initially, the rod 8 is set relative to the top stationary mark DW, at the value of the calculated dead weight tonnage, which is derived from a list by addition of provisions, etc., and the useful load which is to be transported on the trip in question. For this purpose, a list is conveniently used which forms part of the log book of the ship.

Thereupon, the various elements 4 to 7 and A1 to A4 and F1 to F4 are set, rod 4 being set with its zero point at the base line 2, the next rod 5 being set with its zero point at the ton indication at 4' of rod 4, and so on with the rods 6, 7 and the load hold rods A1 etc. and F1 etc., each rod being set with its zero point at the ton indication of the preceding rod.

The sliders 12 and 13 are then set on the values of the last rods A4 and F4, respectively, whereby the weight moments of the aft and fore moments, respectively, may be read as the distance between the appropriate rider and the base line 2. By halving the distance between the riders 12 and 13, for instance, by means of a graduated halving rod which is not shown in the drawing, the mean value of the positions of the riders 12 and 13 may be set on the rod ribbon 8, for the purpose of indicating the combined bending moment about the base line 2. This position is indicated at 14 in the drawing.

Simultaneously, the rod 9 is set relative to the rider 12 in such a position that this rider is set on the same value on the scale 11 as the top DW mark is set relative to the rod ribbon 8, i.e. on the total dead weight tonnage from the list referred to above.

Simultaneously, the position of the rider 13 relative to the rod 9 is indicating the trim of the ship, by means of the distance between the rider 13 and the 0—0 line of the rod 9, at the appropriate draught.

Based on the information indicated by means of the rod 9 regarding the fore and aft position of the trim, the rod 10 is turned about its longitudinal axis, and the rider 13 is moved to a position relative to the line 0—0 on rod 10 corresponding to the trim indicated on rod 9 at the draught in question. Thereby, the draughts fore and aft may be read on the ribbon 8, whereupon the rider 13 is moved along the horizontal draught line indicated on rod 9 to the 0—0 line of the rod 10. The rider 13 is then indicating, at 15, the corrected draught amidship.

From the values read at the various points, at the planned load distribution which is set by means of the various rods, and based on the result indicated as to draught amidship, as compared with a desired or permissible draught, the officer in charge may correct the different loads, such as move some load from A to F or vice versa, to the effect that the vessel, when in operation, will be in the optimal condition at the total load in question. Obviously, this setting, including a possible succeeding correction, is made prior to the actual loading of the load, and the final picture of the condition of the ship may then either remain in the apparatus or be photographed, to the effect that it is possible, during operation, i.e. during the trip envisaged for the ship, to accomplish trimming, by changes in the ballast distribution, so that the condition may be restored even if the use of bunkers, provisions, or the like should cause a change in the condition.

Photographing of the final picture may also be of importance in a possible later dispute, in case of damage or average, passage of canals of prescribed draught or the like.

The principle underlying the present invention, as mentioned, may also be utilised for the derivation of other conditions aboard a vessel, such as derivation of bending moments about any athwartship or fore-and-aft planes, or for the derivation of shearing forces, also in any plane in the vessel. Here, the essential feature is that values are set in relation to each other and added by means of rods which are longitudinally slideable and are graduated in the unity which is of interest in the case in question.

FIGURE 2 illustrates an example of such further utilisation of the principles of the invention, viz, for the indication of shearing forces, and also of bending moments in such a manner that the results are maintained in the apparatus, providing a graphical picture of the values of interest, as distributed along the length of the vessel, so as to give an immediate, visible picture of the actual values underlying the total condition, in relation to prescribed or permitted values at any point of the length under consideration of the vessel.

Similar to the apparatus shown in FIG. 1, this apparatus comprises a panel 20, in which there are arranged a number of parallel guides or slots, each adapted to receive a rod which are individually and longitudinally slideable relative to the panel 20 and to each other, in the manner and for the purposes which are set forth underneath.

At the right edge of the panel 20, there is a vertical line 21, which is graduated in shearing force tons, and which represents the athwartship plane which forms the base of the indications desired, such as the fore perpendicular or the amidship plane L/2 of the vessel. Corresponding to a horizontal zero line 22, the line 21 is graduated upwardly and downwardly, and is provided with an index 23 at the zero line 22.

According to the subdivision of the vessel, the panel 20 is provided with a number of rod assemblies, each consisting of a "dead weight" rod 24 which, along the right edge, is graduated in dead weight tons upwardly from a zero point 0, and also, downwardly from the 0 point indicates the steel weight of the section under consideration of the vessel. Each rod 24 is made of transparent material and carries a device 25 provided with an index 26 which is adapted to cooperate with a trim scale 27 in the rod 24, graduated in feet or inches, and with an index 28 pointing to the left edge of the rod 24. The indexes 26 and 28 are mechanically interconnected, so that a displacement of one of them is accompanied by another, possibly double displacement of the other. This may, by ways of example, be accomplished such that each of the indexes are carried by a nut each engaging a screw thread of different gauges on one and the same bolt which may be actuated from the outside.

Each rod assembly comprises a "buoyancy" rod 29 which is graduated in draught feet, downwardly from a zero point 0, at which there is arranged an index 30 pointing to the left. Further, the rod 24 is provided with lock means 31, which by choice is adapted to lock the rods 24 and 29 to each other, to the effect that the same may be slid relative to each other, and also together relative to the panel 20.

At places in the panel 20, situated midway between the left edge of the rod 29 and the right edge of the rod 24, there is arranged a scale 32, which is graduated upwardly and downwardly from the zero line 22 in ton meters, for the indication of bending moments relative to the zero line 22.

The apparatus shown, is used in the following manner:

By means of the apparatus shown in FIG. 1, the amidship draught and trim is determined at a certain load condition of the vessel in question.

In each rod assembly, the index 26 is set to the trim value on the scale 27, received from FIG. 1, and the rod 29 is displaced relative to the rod 24 until the index 28 is set at the draught indicated on the rod 29 calculated in FIG. 1. The rods 24 and 29 are then locked relative to each other by means of the device 31, and the first rod assembly, to the right in the drawing, is displaced as a whole, until the index 23 of the ton scale 21 is set at the value of the scale on the rod 24 corresponding to the load which is allotted to the section under consideration in the vessel, according to the log book list referred to above.

The vertical distance between the index 30 of the rod 29 and the zero line 22 is then, in the graduation unities of the line 21, indicative of the shearing force in that athwartship plane corresponding to the left edge of the rod 29.

Then, the further rod assemblies are successively set, the load value of the individual sections of the vessel, as indicated by the individual rods 24, being set to the index 30 of the preceding rod assembly. When the points of the various indexes 30 are interconnected, a curve is obtained describing the distribution of the shearing forced along the length of the zero line 22 at the load distribution as envisaged, and this curve is compared with a high and low limit curve 33 and 34, respectively, which is given on the panel 20 for the vessel under consideration. If this curve, through the points of the indexes 30, is approaching or possibly passing one of the curves 33 or 34, this means that a change in the load distribution is required, to the effect that the relative positions of the rods 24 and 29 in each or some of the rod assemblies have to be changed.

As mentioned, the apparatus may also be utilised for the indication of bending moments relative to the line 22. For this purpose the panel 20 is, as mentioned, provided with scales 32. The distance, along each such line 32, between the zero line 22 and the crossing with the shearing force curve is then indicative of the bending moment of the section under consideration as against the line 22. By adding the values so indicated, along the part of the ship's length which is of interest, it is possible to check that the maximum bending moment permitted, is not exceeded. This addition may be accomplished directly, or graphically, possibly by using a further apparatus based on the same principles as those underlying the apparatus shown in FIGS. 1 and 2.

I claim:

1. An apparatus for indicating moments, shearing forces and similar values aboard a vessel, comprising: a panel having a base line thereon; a plurality of first rod elements, corresponding to fore and aft values of said vessel, each of said first rod elements being mutually parallel and longitudinally slidable along respective parallel slots provided on said panel, and each of said first elements being provided with a graduated scale from zero corresponding to a moment value, shearing force value or similar value relative to at least one plan in the vessel, whereby the first ones of said first rod elements which each correspond to said fore and said aft values may be set with their zero point at said base line and the second and subsequent ones of said fore and aft first elements may be set with their respective zero points at the appropriate value of the preceding ones of said first rods; and a pair of sliders extending transversely to the length of said first rod elements, each of said sliders being slidable along slots parallel to said first rod element slots and each corresponding to fore and aft values of said vessel, whereby each of said sliders may be set on the last ones of said fore and aft first members for reading the total value fore and aft to said base line.

2. The apparatus according to claim 1 further including a second rod element parallel to said first rod elements and longitudinally slidable along a slot provided on said panel, and a rotatable element, each of said second and said rotatable elements being graduated in hydrostatic units of the vessel for the indication of bending moments, trim, draught, or meta centric height of the vessel by reason of the relative sliding movement between said sliders and said second and said rotatable elements.

References Cited
UNITED STATES PATENTS

| | | | |
|---|---|---|---|
| 1,525,598 | 2/1925 | Tsuda | 235—70 |
| 2,023,548 | 12/1935 | Ralston | 73—151 |
| 2,432,738 | 12/1947 | Fairbanks | 235—61 |
| 2,496,302 | 2/1950 | Merriam et al. | 235—61 |
| 2,546,641 | 3/1951 | Llanso | 235—61 |
| 3,022,001 | 2/1962 | Larsen | 235—69 |
| 3,086,703 | 4/1963 | Germack | 235—61 |

STEPHEN J. TOMSKY, Primary Examiner

U.S. Cl. X.R.

235—61